Feb. 11, 1964     C. L. LeBLANC     3,120,982
MECHANICAL JOINT

Filed June 27, 1961     3 Sheets-Sheet 1

INVENTOR.
CONRAD L. LeBLANC
BY
*Stanley Sacks*
ATTORNEY.

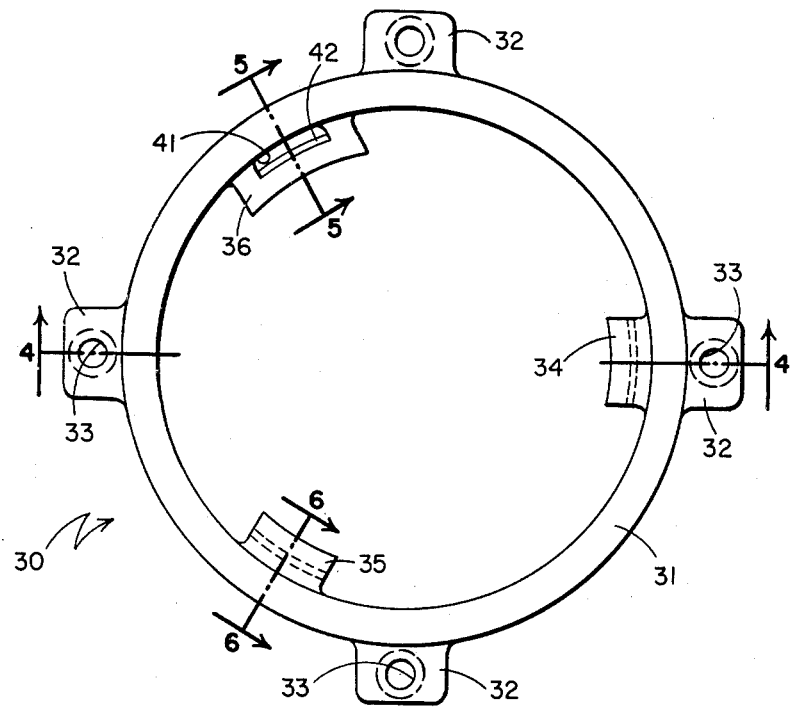
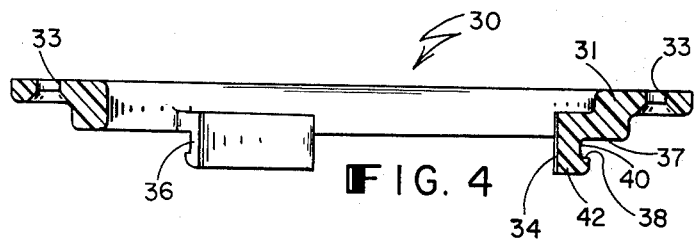
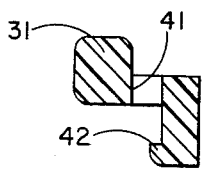
INVENTOR.
CONRAD L. LeBLANC
BY Stanley Sacks
ATTORNEY.

Feb. 11, 1964 C. L. LeBLANC 3,120,982
MECHANICAL JOINT

Filed June 27, 1961 3 Sheets-Sheet 3

INVENTOR.
CONRAD L. LeBLANC
BY
Stanley Sacks
ATTORNEY.

United States Patent Office 3,120,982
Patented Feb. 11, 1964

3,120,982
MECHANICAL JOINT
Conrad L. Leblanc, Leominster, Mass., assignor to Foster Grant Co., Inc., Leominster, Mass., a corporation of Delaware
Filed June 27, 1961, Ser. No. 119,976
6 Claims. (Cl. 308—135)

This invention relates generally to the art of rotatable mechanical joints. More specifically, this invention relates to plastic swivel joints for use in attaching two objects together which are rotatable with respect to each other substantially along a plane.

Rotatable mechanical joints or swivels are well known in the art. A vast number of such joints have been employed in such various applications as, stool swivels, TV table swivels, lazy susan swivels, coffee table swivels, etc. Commonly these known swivels are composed of metallic members. The use of metallic members has been considered essentially by prior art workers in those applications where the joint is subjected to any significant degree of tensile or compression stresses.

Conventional metallic swivel joints normally comprise several individual co-operating elements. Thus, in addition to interlocking elements of these swivels, anti-friction devices such as ball bearings are employed to relieve sliding and frictional stresses encountered in various usages. Assemblies of the above type are disadvantageous in that they are difficult to manufacture and install, frequently expensive and require periodic maintenance, e.g., periodic lubrication and adjustment. In addition, the lubricants employed frequently create problems in that they tend to drain from the joints and soil or damage surrounding areas.

I have now found that a relatively inexpensive swivel joint useful for applications wherein significant tensile and/or compressive forces are encountered, can be formed of a plastic material. Surprisingly, the swivel joint of my invention may comprise as few as two members, and still function with the same degree or higher efficiency than prior art multi-component swivel joints. I employ synthetic linear polyamide or nylon materials in the advantageous swivel joints of the present invention. These materials enable the production of noiseless, greaseless, durable and relatively inexpensive swivel joints of the instant invention.

Any of the well known nylon materials, i.e., synthetic linear superpolyamides such as Nylon 6, Nylon 6, 6, Nylon 6, 10, etc. can be employed to advantage in the swivel joints of my invention. These materials can be shaped as by injection molding to form the two component joints of my invention. Surprisingly, such joints are noiseless, durable, longlasting, and do not require periodic maintenance or lubrication. Installation of these joints in various applications is relatively simple and economical. I have found that the two units of my joint may be snapped together, either before or after installation on the members to be joined with no adjustment or lubrication being necessary.

Basically my invention comprises a two member swivel joint device. The members are adapted to engage each other to allow a rotating action of each member in a plane substantially parallel to the plane of the other member. Each member carries complementary engaging or coupling means which are preferably simple mating hook devices. The particular engaging or coupling means as well as specific means for attaching the members to objects to be joined may vary depending on the particular application. The members can easily be snapped together in use to form the novel joint of the present invention. As an alternative form of my invention, I can employ nylon inserts at the load bearing sliding surfaces of a swivel joint.

The features of my invention will become readily apparent from the following detailed description and illustrations which are not limiting but only illustrative of the preferred embodiments of my invention. In the attached drawings like numerals represent like parts.

FIGURE 3 is a top plan view of a second member of a swivel joint of this invention.

FIGURE 4 is a side sectional view taken along line 4—4 of FIGURE 3.

FIGURE 5 is a side sectional view showing an alternate embodiment of my invention taken along line 5—5 of FIGURE 3.

FIGURE 6 is a side sectional view taken along line 6—6 of FIGURE 3.

Figure 1:
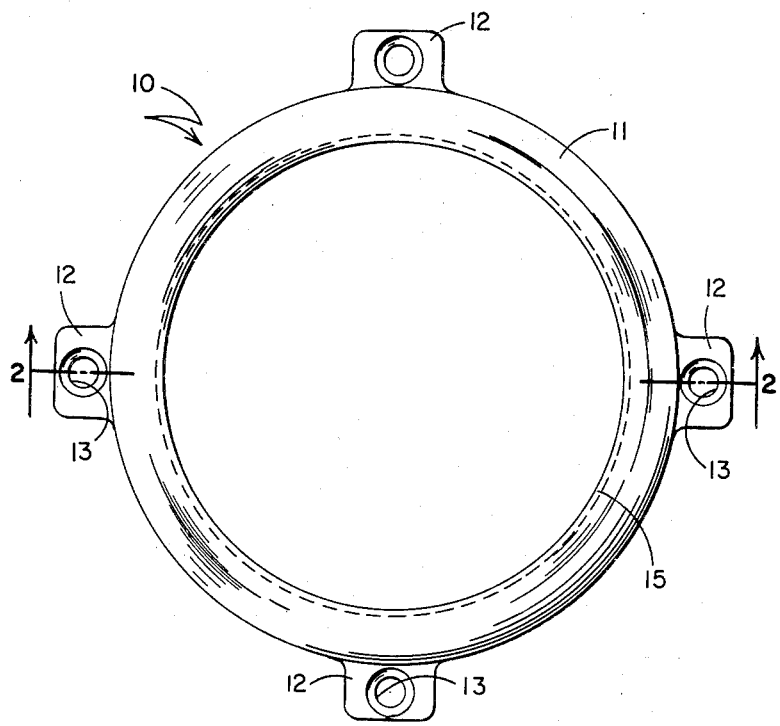
FIGURE 1 is a top plan view of a first member of a swivel joint of this invention.
Figure 2:
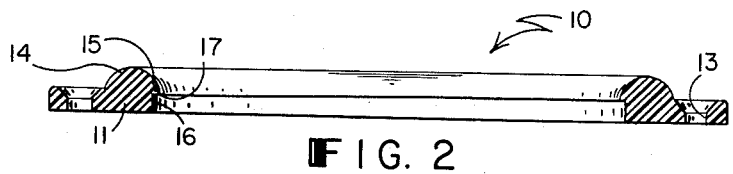
FIGURE 2 is a side sectional view taken along line 2—2 of FIGURE 1.

The swivel joint of my invention preferably comprises two plastic members, i.e., a first integral nylon member as shown in FIGURES 1 and 2 and a second integral nylon member as shown in FIGURES 3–6.

The first integral nylon member 10 comprises a substantially circular collar or ring 11 having mounting tabs 12 thereon said tabs having counter-sunk holes 13 bored therein. Although four mounting tabs are shown, it is obvious that any number of tabs may be employed depending on the particular application of the swivel joint. In some applications it is possible to provide mounting holes for rivets or screws through the collar or ring 11 without the employment of tabs. It should be understood that the particular means of mounting the swivel joint of my invention may be selected from a multitude of means well known to the art, i.e., adhesives, screws, rivets, staples, etc.

Figure 7:
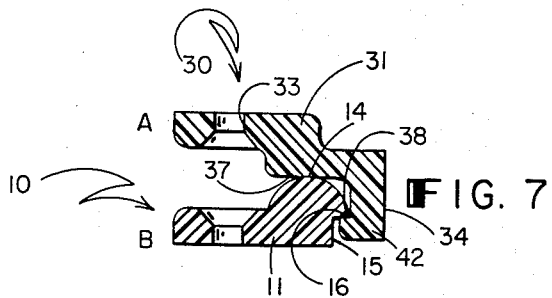
FIGURE 7 is a side sectional view of one portion of the first and second members showing them in assembled relationship.
Figure 8:
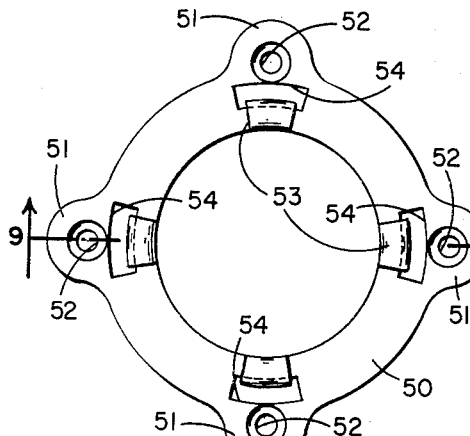
FIGURE 8 is a top plan view of a first member of an alternate embodiment of this invention.
Figure 10:
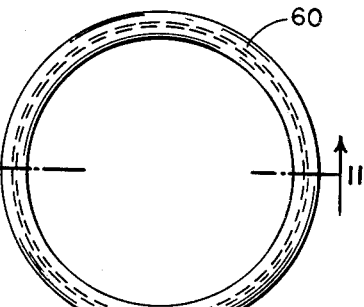
FIGURE 10 is a top plan view of a second member of an alternate embodiment of this invention.
Figure 9:
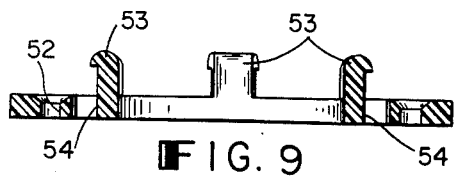
FIGURE 9 is a side sectional view taken along line 9—9 of FIGURE 8.
Figure 11:
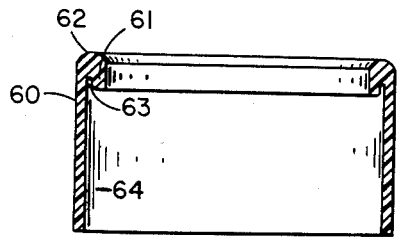
FIGURE 11 is a side sectional view taken along line 11—11 of FIGURE 10.

As best seen in FIGURES 2 and 7 the collar 11 comprises a rounded surface 14 which acts as a bearing surface when the first and second members 10 and 30 are assembled. The rounded bearing surface is employed to enable easier sliding contact between the joint members when in assembled relationship. A substantially continuous hook or extension portion 15 is formed on the collar 11 on the inner portion thereof thus creating a cut back or enlarged diameter portion 16. Thus, wall 17 provides a bearing surface for engaging a corresponding bearing surface of a portion of the second member 30.

The second integral nylon member 30 comprises a generally circular collar or ring 31 having four mounting tabs 32 containing counter-sunk holes 33 therein. As noted in relation to the first member, the particular mounting means may vary depending on particular applications of the swivel joint. Hooks or engaging extensions 34, 35, and 36 are integrally carried on the inner portion of collar 31 spaced at uniform distances apart. The number of hooks or engaging extensions may vary depending on the particular application of the swivel joint.

Hook 35 as best seen in FIGURES 3, 4 and 6 comprises a boss or enlarged outwardly extending portion 42 providing a hook or bearing surface 38 preferably inturned at an angle greater than 90° and a groove or recessed wall 40. The surface 37 acts as a bearing surface for rounded surface 14 of collar 11 when the swivel joint is assembled.

Hook 36 is of slightly different construction than hooks 34 and 35. In actual use all of the hook portions are normally identical, however, the modified hook 36 is shown for purposes of illustrating a preferred embodiment of the invention. Hook 36 is basically similar to hooks 34 and 35. However, hook 36 is adapted to be integrally molded as a part of member 30 without the use of complicated sliding or collapsible section in order to mold one piece units. The employment of slot 41 directly under boss 42 allows an integral portion of the forming die to form the bass 42 and eliminate undercut portions allowing simple molding with conventional molding equipment.

The swivel joint is assembled by merely placing hooks 34, 35 and 36 over extension portion 15 and applying pressure to either or both members. Due to the inherent flexibility of nylon materials, the assembly step may be performed manually. Preferably, the two members of the joint are first attached to the objects to be joined and subsequently snapped together to form the joint. For example, the first member 10 may be attached to the base of a stool and the second member 30 attached to the seat portion of a stool. The stool is then assembled by merely placing the seat above the base and manually pushing downwardly thereon. Although the nylon joint members are flexible enough to snap into position, once in place they form a strong joint that remains intact during use of the stool. The joint assembled in this manner is illustrated at FIGURE 7 showing the interlocking members 15 and 42. Alternatively, the members of the joint may be assembled and later attached to the objects to be joined.

FIGURES 8 through 11 illustrate an alternate embodiment of my invention wherein one member of the joint is adapted to be attached to a cylindrical or post device. Nylon ring member 50 has four attachment tabs 51 and counter-sunk holes 52 circularly arranged thereon. Integral with member 50 are four upstanding hook or extension portions 53. It should be understood that the number of hook portions may vary as desired. In some instances, in order to provide sufficient strength, a hook portion may extend substantially around the entire ring member. Slots 54 are preferably employed as in the first embodiment of this invention to avoid the formation of undercut areas requiring complicated molding techniques.

The second nylon member of this embodiment comprises a tubular member 60 having an inturned lip 61 and a rounded bearing surface 62. The inturned lip 61 forms a circular cavity 63 between the lip 61 and the body of the cylindrical member 60.

The swivel joint of this embodiment may be assembled in substantially the same manner as described for the first specific embodiment. Members 60 and 50 may be snapped together and attached to the objects to be joined. Member 60 is specially adapted to be fitted over a cylindrical tube which nests in circular cavity 63. Since the hook portions 53 do not traverse the entire width of the lip edge the joint is free to rotate. Alternatively, stops, not shown, may be placed along the wall 64 to position the cylindrical object to be joined slightly away from inturned lip 61. Further, the lip 61 may be formed at substantially a right angle to wall 64 so as to provide a flange and eliminate cavity 63.

Figure 12:
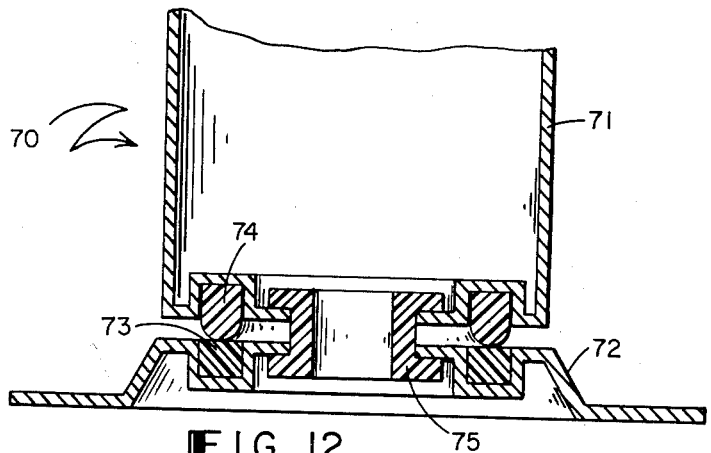
FIGURE 12 is a side sectional view of a further alternate embodiment of a joint of this invention.

Although I prefer to employ two piece nylon swivel joints, it is obvious that in its broadest aspects my invention covers the use of nylon to nylon swivel contacts of all sorts. Thus, FIGURE 12 illustrates a substantially metallic joint 70 having nylon swivel contacts.

Cylindrical metallic member 71 is provided with a circular recess which contains a nylon ring 74 having a rounded extending protuberance thereon. Metallic member 72 is provided with a recess which contains a nylon ring 73 therein. Grommet 75 is preferably nylon although a metallic material may be employed if the joint will be subjected substantially to compressive forces in operation. In use the nylon inserts 73 and 74 are in engaging contact and provide a rotating swivel surface. Nylon ring 74 can be continuous as shown or if desired, discontinuous nylon members may be employed in the recess of member 71. Thus, any number of generally circularly arranged nylon bearing members may be positioned in or on member 71. As in all of my swivel joints, it is desired that a nylon to nylon contact be employed at the load bearing rotating surfaces of the swivel joint.

While I have shown and described various specific embodiments of my invention, it should be understood that my invention is not limited merely to these embodiments. Many alterations and changes may be made without departing from the spirit and scope of this invention which is set forth in the appended claims which are to be construed as broadly as possible in view of the prior art.

I claim:

1. A mechanical swivel joint device comprising, in combination, a first flexible thermoplastic organic material member including a collar, said collar having a bearing surface on one side thereof and a hook, a second flexible thermoplastic organic material member including a bearing surface on one side thereof and a hook, said bearing surface of said first member engaging said bearing surface of said second member, one of said bearing surfaces being substantially rounded and the other of said bearing surfaces being substantially flat, said hook of said first member engaging said hook of said second member whereby each of said members are engaged by snapping them together and whereby each of said members rotate in a plane parallel to the plane of the other member without becoming disengaged.

2. The mechanical swivel joint device of claim 1 wherein said flexible thermoplastic organic material is nylon.

3. A mechanical swivel joint device comprising, in combination, a first flexible nylon member including a substantially ring shaped collar, said collar having a bearing surface and a hook portion integral with said collar, said hook portion extending away from said collar, a second flexible nylon member including a substantially ring shaped collar, said collar having a bearing surface and a hook portion integral with said collar, said bearing surface of said first member engaging said bearing surface of said second member, one of said bearing surfaces being substantially rounded and the other of said bearing surfaces being substantially flat, said hook of said first member engaging said hook of said second member, whereby each of said members are engaged by snapping them together and whereby each of said members rotate in a plane parallel to the plane of the other member without becoming disengaged.

4. A mechanical swivel joint device comprising, in combination, a first flexible thermoplastic organic material member and a second flexible thermoplastic organic material member, said first member including a substantially ring shaped collar and means for engaging said second member in slidable relationship therewith along a plane, said collar having means for attaching said collar to an object, said second member including a substantially cylindrical portion having an inwardly extending flange at one end, said flange engaging and holding said first member in slidable relationship therewith along a plane.

5. The mechanical swivel joint of claim 4 wherein said flexible thermoplastic organic material is nylon.

6. The mechanical swivel joint of claim 4 wherein said flange is inturned at an angle greater than 90° thereby forming a generally circular cavity between a portion of said flange and said substantially cylindrical portion.

References Cited in the file of this patent

UNITED STATES PATENTS

| | | |
|---|---|---|
| 633,000 | Gressom | Sept. 12, 1899 |
| 1,101,321 | Nocher | June 23, 1914 |
| 1,912,101 | Short | May 30, 1933 |
| 2,724,867 | Smith | Nov. 29, 1955 |